United States Patent
Watts et al.

(10) Patent No.: US 10,250,680 B2
(45) Date of Patent: *Apr. 2, 2019

(54) GATEWAY MANAGEMENT USING VIRTUAL GATEWAYS AND WILDCARDS

(71) Applicant: SYSTECH CORPORATION, San Diego, CA (US)

(72) Inventors: La Vaughn Ferguson Watts, Austin, TX (US); Jeff Rucker, Del Mar, CA (US); Anderson Wiese, Champaign, IL (US); Roger Wellington-Oguri, San Diego, CA (US)

(73) Assignee: SYSTECH CORPORATION, San Diego ( * ) Notice: Subject to any disclaimer, the term of this patent is extended or adjusted under 35 U.S.C. 154(b) by 0 days.

This patent is subject to a terminal disclaimer.

(21) Appl. No.: 15/887,899

(22) Filed: Feb. 2, 2018

(65) Prior Publication Data

US 2018/0159930 A1    Jun. 7, 2018

Related U.S. Application Data

(63) Continuation of application No. 14/656,497, filed on Mar. 12, 2015, now Pat. No. 9,888,072.

(Continued)

(51) Int. Cl.
*H04L 29/08*    (2006.01)
*H04L 29/06*    (2006.01)
(Continued)

(52) U.S. Cl.
CPC .......... *H04L 67/1095* (2013.01); *H04L 41/22* (2013.01); *H04L 67/02* (2013.01);
(Continued)

(58) Field of Classification Search
CPC ....... H04L 67/109; H04L 67/42; H04L 67/10; H04L 67/02; H04L 67/28
See application file for complete search history.

(56) References Cited

U.S. PATENT DOCUMENTS 7,466,710 B1    12/2008   Clemm et al.
8,082,579 B2    12/2011   Shimizu et al.
(Continued)

FOREIGN PATENT DOCUMENTS

CN    103312605 A    9/2013
EP    2528302 A1    11/2012

OTHER PUBLICATIONS

International Search Report and Written Opinion for related PCT/US2015/020227, dated Jun. 18, 2015, in 12 pages.
(Continued)

*Primary Examiner* — Kim T Nguyen
(74) *Attorney, Agent, or Firm* — Procopio, Cory, Hargreaves & Savitch LLP

(57) ABSTRACT

Systems, methods, and media for managing gateways. In an embodiment, a virtual gateway is generated which comprises a representation of each of one or more active scripts and/or device information (e.g., device drivers, and/or definitions and/or configurations for devices, device types, and/or device groups) stored on at least one remote physical gateway. At least one user interface is provided for editing each of the one or more active scripts and/or device information represented in the virtual gateway. Synchronization is automatically maintained, across at least one network, between the one or more active scripts and/or device information represented in the virtual gateway and the one or more active scripts and/or device information stored on the at least one remote physical gateway.

18 Claims, 6 Drawing Sheets

Related U.S. Application Data

(60) Provisional application No. 61/952,655, filed on Mar. 13, 2014.

(51) Int. Cl.
*H04L 12/24* (2006.01)
*H04W 88/16* (2009.01)
*H04W 4/70* (2018.01)

(52) U.S. Cl.
CPC .............. *H04L 67/10* (2013.01); *H04L 67/28* (2013.01); *H04L 67/42* (2013.01); *H04W 4/70* (2018.02); *H04W 88/16* (2013.01); *H04L 41/08* (2013.01); *Y04S 40/162* (2013.01)

(56) References Cited

U.S. PATENT DOCUMENTS

| | | | | |
|---|---|---|---|---|
| 8,108,855 | B2 * | 1/2012 | Dias | G06F 8/60 709/203 |
| 9,888,072 | B2 * | 2/2018 | Watts, Jr. | H04L 67/1095 |
| 2005/0120160 | A1 * | 6/2005 | Plouffe | G06F 9/45537 711/1 |
| 2007/0118609 | A1 | 5/2007 | Mullan et al. | |
| 2007/0239893 | A1 | 10/2007 | Crowe | |
| 2007/0294407 | A1 | 12/2007 | Owen et al. | |
| 2007/0294563 | A1 | 12/2007 | Bose | |
| 2008/0313305 | A1 | 12/2008 | Long | |
| 2009/0064279 | A1 | 3/2009 | Ardolino | |
| 2009/0106834 | A1 | 4/2009 | Borzycki et al. | |
| 2009/0177996 | A1 | 7/2009 | Hunt et al. | |
| 2010/0057845 | A1 | 3/2010 | Thomas et al. | |
| 2010/0071020 | A1 | 3/2010 | Addington et al. | |
| 2011/0116509 | A1 | 5/2011 | Moreno et al. | |
| 2011/0208838 | A1 | 8/2011 | Thomas et al. | |
| 2013/0047151 | A1 | 2/2013 | Sridharan et al. | |
| 2013/0223444 | A1 | 8/2013 | Liljenstolpe et al. | |
| 2014/0059546 | A1 | 2/2014 | Holland et al. | |

OTHER PUBLICATIONS

Office Action and search report for related CN Patent Application No. 201580008489X, dated Dec. 4, 2018, in 10 pages.

Extended European Search Report for related EP Patent Application No. 15760844.9, dated Oct. 4, 2017, in 7 pages.

* cited by examiner

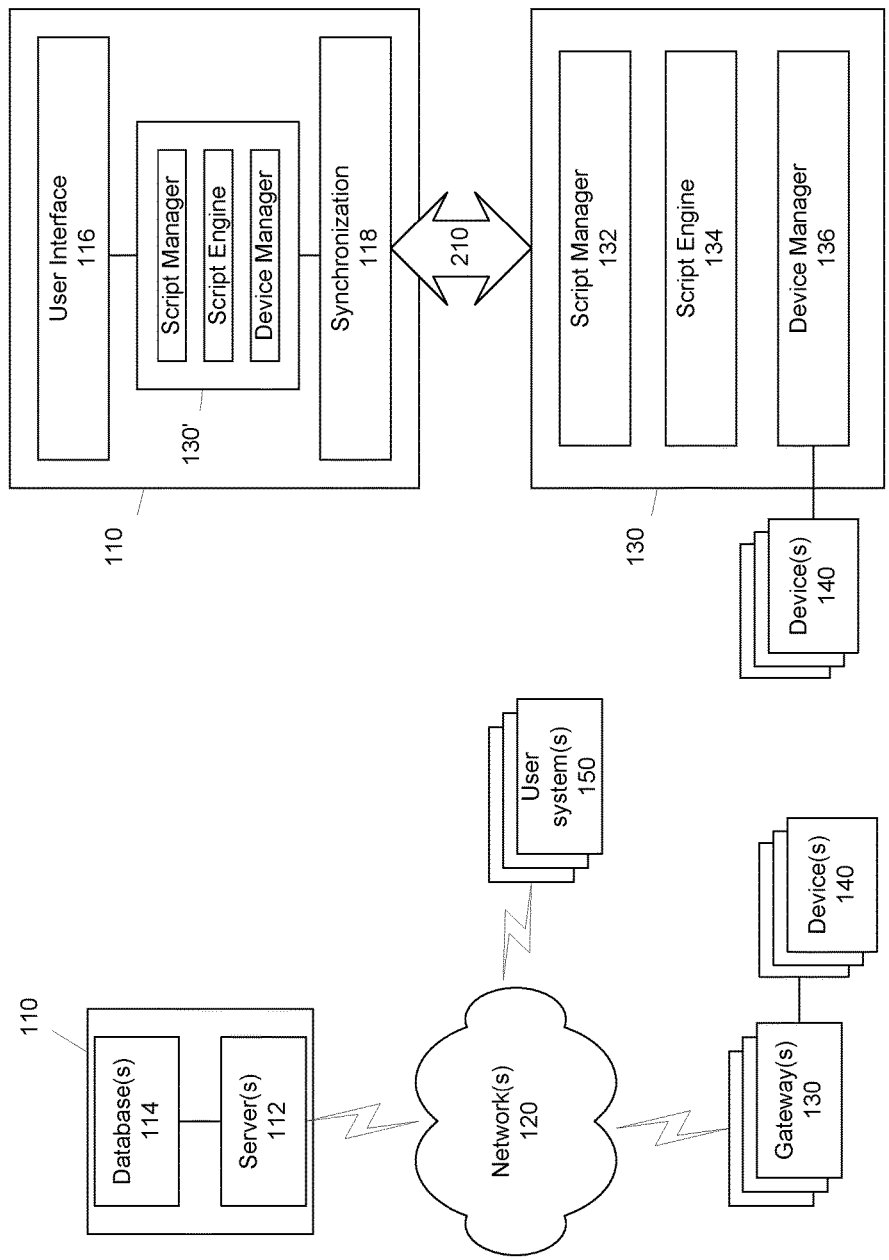

GATEWAY MANAGEMENT USING VIRTUAL GATEWAYS AND WILDCARDS

CROSS-REFERENCE TO RELATED APPLICATIONS

This application is a continuation of U.S. patent application Ser. No. 14/656,497, filed on Mar. 12, 2015, which claims priority to U.S. Provisional Patent App. No. 61/952,655, filed on Mar. 13, 2014—the entireties of both of which are hereby incorporated herein by reference.

BACKGROUND

Field of the Invention

The embodiments described herein are generally directed to the management of gateways, and, more particularly, to the management of control scripts and/or drivers on physical gateways via virtual gateways.

Description of the Related Art

The use of machine-to-machine (M2M) systems is and will continue to be a prevalent aspect of commerce and society. M2M systems are an integral part of the Internet of Things (IoT), and have a wide range of applications, including monitoring and control for industrial and building automation, smart facilities, smart grids, smart cities, healthcare, hospitality, food services, and the like.

In M2M and IoT ecosystems, communications between devices in a machine-to-machine system may be performed using a gateway device positioned between the devices. The gateway device may also provide additional services, such as the secure execution of applications, including control, monitoring, reporting, and alerting scripts, the configuration and activation/deactivation of one or more devices, device types, and/or device groups, and data capture and reporting for devices, device types, and/or device groups communicatively connected to the gateway device.

As a simple example, in the context of industrial automation, various devices within a physical facility may be communicatively connected to a gateway device for the facility. These devices may comprise sensors (e.g., temperature sensors, open/closed sensors, locked/unlocked sensors) and operable devices, such as doors, windows, locks, lights, gates, valves, etc. The gateway device may execute one or more control scripts which monitor one or more of the devices (e.g., by receiving temperature measurements from a temperature sensor, receiving the status of a door lock, etc.) and control one or more of the devices based on the monitoring of other devices and/or conditions (e.g., turning on a light if a gate is opened, unlocking or locking a door at a certain time, sounding an alarm if a temperature exceeds a certain threshold, etc.).

In distributed monitoring and control systems (e.g., over a large facility or over multiple geographically-dispersed facilities), multiple gateways may communicate with each other and/or a central platform over one or more networks (e.g., the Internet). In such situations, there may be numerous gateways (e.g., hundreds) that must be configured, installed, operated, and managed. This can make it difficult to ensure that each gateway and any associated scripts and devices, device types, and/or device groups have been properly configured, tested, implemented, updated, or backed up to ensure expected operation.

Thus, what are needed are technologies that enable more efficient management of gateways, including the definition of gateways, scripts, and devices, device types, and/or device groups, configuration, testing, implementation, update, and recovery within M2M, IoT, cloud-based, and/or distributed-server-based systems.

SUMMARY

Accordingly, systems, methods, and media are disclosed for managing gateways.

In an embodiment, a system is disclosed. The system comprises: at least one hardware processor; and one or more modules that, when executed by the at least one hardware processor, generate a virtual gateway which comprises a representation of each of one or more active scripts and active devices information (e.g., device drivers, and/or definitions and/or configurations for devices, device types, and/or device groups) stored on at least one remote physical gateway; provide at least one user interface for editing each of the one or more active scripts and active information represented in the virtual gateway; and automatically maintain synchronization, across at least one network, between the one or more active scripts and active device information represented in the virtual gateway and the one or more active scripts and active device information stored on the at least one remote physical gateway.

In another embodiment, a method is disclosed. The method comprises using at least one hardware processor to: generate a virtual gateway which comprises a representation of each of one or more active scripts and active information stored on at least one remote physical gateway; provide at least one user interface for editing each of the one or more active scripts and active device information represented in the virtual gateway; and automatically maintain synchronization, across at least one network, between the one or more active scripts and active information represented in the virtual gateway and the one or more active scripts and active device information stored on the at least one remote physical gateway.

In another embodiment, a non-transitory computer-readable medium having instructions stored thereon is disclosed. The instructions, when executed by a processor, cause the processor to: generate a virtual gateway which comprises a representation of each of one or more active scripts and active device information stored on at least one remote physical gateway; provide at least one user interface for editing each of the one or more active scripts and active device information represented in the virtual gateway; and automatically maintain synchronization, across at least one network, between the one or more active scripts and active device information represented in the virtual gateway and the one or more active scripts and active device information stored on the at least one remote physical gateway.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 illustrates an infrastructure in which embodiments of disclosed systems, methods, and media may operate, according to an embodiment;

FIG. 2 illustrates systems for synchronizing gateways, according to an embodiment;

DETAILED DESCRIPTION

Figure 3:
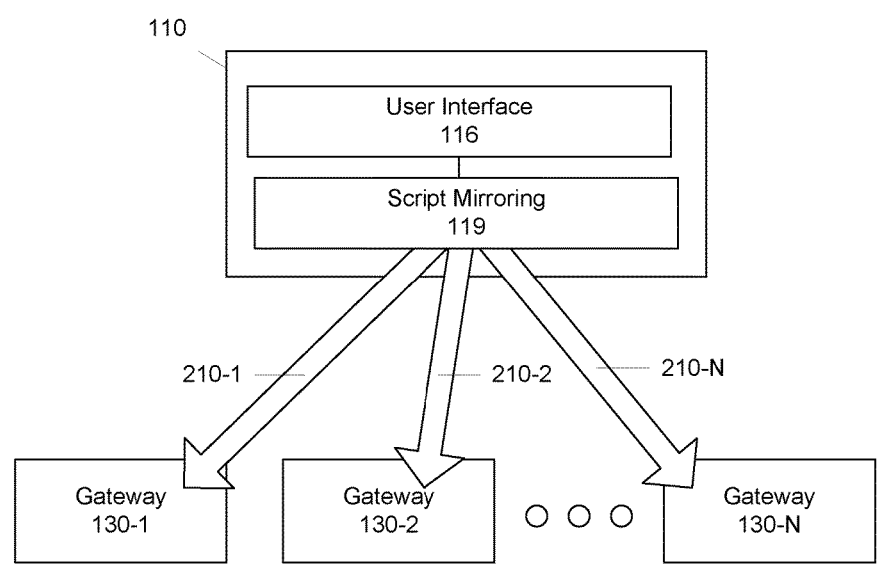
FIG. 3 illustrates systems for mirroring and synchronizing a script to a plurality of gateways, according to an embodiment.

In an embodiment, systems, methods, and media are disclosed for the management of gateways, including the execution, creation, configuration, testing, implementation, operation, updating, backing-up, and recovery of virtual gateways, physical gateways, control scripts, and/or device information (e.g., device drivers, and/or definitions and/or configurations for devices, device types, and/or device groups). After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

There are at least five major challenges in the design, testing, implementation, operation, and recovery of distributed M2M and IoT ecosystems:

(1) Device, device type, and device group identification, definition, configuration, curation, operation, updating, performance analysis, recovery, and communications;

(2) Script creation, operational/performance testing, curation, implementation, and updating for device and gateway operation, monitoring, control, performance analysis, recovery, and management;

(3) Gateway configuration, creation, operational/performance testing, curation, implementation, updating, recovery, performance analysis, and management;

(4) Efficient M2M and IoT ecosystem design, testing, implementation, operation, recovery, and management; and (5) Efficient integration and implementation of new devices, device types, device groups, scripts, communications, control protocols, and industry standards into M2M and IoT ecosystems.

Certain embodiments disclosed herein address these challenges, for example, through one or more of the following:

(1) Providing the capability for entitled users (e.g., granted specific access, authority, and permission to access selected defined physical and/or logical components in an ecosystem and/or execute selected defined physical and/or logical functions in the ecosystem) to create, define, and test virtual representations of particular devices, device types, and/or device groups, thereby enabling these entitled users to:

(a) Define the properties, associated values, and communications/control protocols (e.g., BACnet, EnOcean, Bluetooth Low Energy, etc.) for a particular virtual device (e.g., a specific model of thermostat);

(b) Define the properties, associated values, and communications/control protocols for a particular type of virtual device (e.g., any model of thermostat);

(c) Define the properties, associated values, and communications/control protocols for a group of virtual devices (e.g., a building HVAC system, which could include, without limitation, one or more thermostats, boiler controllers, $CO_2$ gas detectors, gas shut-off valves, chiller controllers, water detectors, water shut-off valves, damper controllers, occupancy detectors, sunlight sensors, etc.);

(d) Define virtual gateway loads for communications/control protocols, processing, memory, and data storage for virtual devices, virtual device types, and/or virtual device groups; and/or (e) Utilize wildcard(s) for virtual devices, virtual device types, and/or virtual device groups that, when scripts containing such wildcard(s) are activated and implemented on one or more physical gateways, are automatically replaced ("dereferenced") by an identifier or other representation of a particular physical device, particular type of device, and/or particular group of devices that are communicatively connected to those physical gateways, such that all applicable associate property values assigned for the physical device, type of device, and/or group of devices are automatically updated to those defined in their corresponding virtual representations;

(2) Providing the capability for entitled users to create, define, and test scripts in the virtual environment, including:

(a) Creating scripts and assigning virtual devices, device types, and/or device groups affected by the scripts;

(b) Testing operation and performance characteristics of scripts and their associated virtual devices, device types, and/or device groups; and/or (c) Creating a library of scripts and associated virtual devices, device types, and/or device groups;

(3) Providing the capability for entitled users to create, define, and test virtual gateways, including:

(a) Defining the properties, associated values, and communications/control protocols (e.g., BACnet, EnOcean, Bluetooth Low Energy, etc.) for a particular virtual gateway (e.g., Floor 1, Building 10, North Campus location);

(b) Defining the properties, associated values, and communications/control protocols for a particular type of virtual gateway (e.g., a specific model of gateway);

(c) Defining the properties, associated values, and communications/control protocols for a group of virtual gateways (e.g., Building 10, North Campus location);

(d) Assigning one or more virtual devices, device types, and/or device groups to a virtual gateway, virtual gateway type, and/or virtual gateway group;

(e) Removing one or more virtual devices, virtual device types, and/or virtual device groups from a virtual gateway, virtual gateway type, and/or virtual gateway group;

(f) Testing the operation, performance, loads for communications/control protocols, processing, memory, and/or data storage of virtual devices, virtual device types, and/or virtual device groups assigned to virtual gateways, virtual gateway types, and/or virtual gateway groups;

(g) Individually and/or collectively, assigning scripts and associated virtual devices, virtual device types, and/or virtual device groups to a virtual gateway to test the operation, performance, loads communication/control protocols, processing, memory, and/or data storage for the virtual devices, virtual device types, and/or virtual device groups;
  (h) Individually and/or collectively, assigning scripts and associated virtual devices, virtual device types, and/or virtual device groups to a virtual gateway type to test the operation, performance, loads communication/control protocols, processing, memory, and/or data storage for the virtual devices, virtual device types, and/or virtual device groups;
  (i) Individually and/or collectively, assigning scripts and associated virtual devices, virtual device types, and/or virtual device groups to a virtual gateway group to test the operation, performance, loads communication/control protocols, processing, memory, and/or data storage for the virtual devices, virtual device types, and/or virtual device groups;
  (j) Activating one or more scripts and associated virtual devices, virtual device types, and/or virtual device groups for a virtual gateway, virtual gateway type, and/or virtual gateway group;
  (k) Deactivating one or more scripts and associated virtual devices, virtual device types, and/or virtual device groups for a virtual gateway, virtual gateway type, and/or virtual gateway group;
  (l) Maintaining a library of active and inactive virtual devices, virtual device types, and/or virtual device groups for virtual gateways, virtual gateway types, and/or virtual gateway groups;
  (m) Maintaining a library of active/inactive, draft, verified, and unverified scripts and associated virtual devices, virtual device types, and/or virtual device groups for virtual gateways, virtual gateway types, and/or virtual gateway groups; and
  (n) Individually and/or collectively, assigning one or more virtual gateways, virtual gateway types, and/or virtual gateway groups to a computing environment to identify the resources required and their performance in order to design, test, finalize, implement, manage, and update the physical environment required to efficiently support the M2M or IoT ecosystem;
(4) Enabling entitled users to select one or more physical gateways on which to implement a particular virtual gateway and its active script(s), virtual device(s), virtual device type(s), and/or virtual device group(s). If the active script(s) to be implemented on the physical gateway(s) reference virtual device(s), virtual device type(s), and/or virtual device group(s) and the physical gateway(s) are not communicatively connected to corresponding physical device(s), physical device type(s), and/or physical device group(s), the activation of the virtual device(s), virtual device type(s), and/or virtual device group(s) may be suspended until communications are established between the physical gateway(s) and the corresponding physical device(s), physical device type(s), and/or physical device group(s). Once communication has been established, each of the physical device(s), physical device type(s), and/or physical device group(s) can be synchronized with its corresponding virtual device(s), virtual device type(s), and/or virtual device group(s), respectively. Suspension of device(s), device type(s), and/or device group(s) will not affect the operation of the implemented, active scripts:
  (a) An entitled user can implement gateways using mirroring, in which case all physical gateways that mirror a particular virtual gateway will be automatically synchronized whenever that virtual gateway is changed and/or whenever any physical gateway within the set of mirrored physical gateways is changed; and
  (b) An entitled user can implement gateways using copying, in which case all physical gateways that implement a copy of a virtual gateway will automatically be initialized according to that virtual gateway as the source of configuration. In an embodiment, for each copied physical gateway, an associated mirrored virtual gateway is created. Changes that are activated on either the copied virtual gateway or a physical gateway that implements the copy will be synchronized between the two;
(5) Enabling entitled users to select one or more physical gateway types on which to implement a virtual gateway type and its active script(s), virtual device(s), virtual device type(s), and/or virtual device group(s):
  (a) An entitled user can implement gateways using mirroring based on type of gateway, in which case all physical gateway that are of a type that mirrors a particular virtual gateway type will be automatically synchronized whenever that virtual gateway type is changed and/or whenever any physical gateway of the mirrored type is changed; and
  (b) An entitled user can implement gateways using copying based on type of gateway, in which case all physical gateways that are of a type that is a copy of a virtual gateway type will automatically be initialized according to that virtual gateway type as the source of configuration. In an embodiment, for each physical gateway type, an associated mirrored virtual gateway type is created. Changes that are activated on either the copied virtual gateway type or a physical gateway that implements the copied virtual gateway type will be synchronized between the two;
(6) Enabling entitled users to select one or more physical gateway groups on which to implement a virtual gateway group and its active script(s), virtual device(s), virtual device type(s), and/or virtual device group(s):
  (a) An entitled user can implement gateways using mirroring based on an associated group of gateways, in which case all physical gateway that are in a group that mirrors a particular virtual gateway group will be automatically synchronized whenever that virtual gateway group is changed and/or whenever any physical gateway in the group is changed; and
  (b) An entitled user can implement gateways using copying based on an associated group of gateways, in which case all physical gateways that are in a group that is a copy of a virtual gateway group will automatically be initialized according to that virtual gateway group as the source of configuration. In an embodiment, for each physical gateway group, an associated mirrored virtual gateway group is created. Changes that are activated on either the copied virtual gateway group or a physical gateway that implements the copied virtual gateway group will be synchronized between the two; and
(7) Enabling recovery:
  (a) For physical gateways, physical gateway types, and/or physical gateway groups that implement a copy of a virtual gateway, virtual gateway type, and/or virtual gateway group:
    (i) If the physical gateway, physical gateway type, and/or physical gateway group goes offline due to a communications issue, when it comes back online, it will automatically synchronize with its associated virtual gateway, virtual gateway type, and/or virtual gateway group, respectively; and, (ii) If the physical gateway, physical gateway type, and/or physical gateway group goes offline due to system failure, when it comes back online, it will automatically download the most recently synchronized copy of its associated virtual gateway, virtual gateway type, and/or virtual gateway group, respectively; and (b) For physical gateways, physical gateway types, and/or physical gateway groups that mirror a virtual gateway, virtual gateway type, and/or virtual gateway group, if the physical gateway, physical gateway type, and/or physical gateway group goes offline due to a communications issue or system failure, when it comes back online, it will automatically synchronize with its mirrored virtual gateway, virtual gateway type, and/or virtual gateway group, respectively, 1. System Overview 1.1. Infrastructure FIG. 1 illustrates an example system for the management of control scripts and/or drivers, according to an embodiment. The system may include a platform 110 comprising a set of one or more servers 112 which host and/or execute one or more of the various functions, processes, methods, and/or software modules described herein. It should be understood that platform 110 may comprise a cloud environment which may or may not be dedicated to the disclosed gateway management processes. In a cloud environment, resources, such as virtual, logical, and/or physical computing resources, storage resources, security resources, communications resource, management resources, and the like, may be shared and/or dedicated among services and applications.

In addition, platform 110 may be communicatively connected (e.g., via one or more components, such as a communications resource of platform 110) to one or more gateways 130 and/or one or more user systems 150 via one or more network(s) 120 and may also be communicatively connected to one or more database(s) 114 (e.g., via one or more network(s), such as network(s) 120 or a private network, or via a direct connection) and/or may comprise one or more database(s) 114. Network(s) 120 may comprise the Internet, and server(s) 112 may communicate with gateway(s) 130 and user system(s) 150 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. It should also be understood that the components of platform 110 (e.g., cloud resources, such as server(s) 112) may be, but are not required to be, collocated. Furthermore, while platform 110 is illustrated as being connected to various systems through a single set of network(s) 120, it should be understood that platform 110 may be connected to the various systems via different sets of one or more networks. It should also be understood that gateway(s) 130 and/or user system(s) 150 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, Point-of-Sale (POS) terminals, intelligent wearable devices, medical or healthcare devices, any device within an IoT ecosystem, and the like. In addition, each gateway 130 may be communicatively connected with one or more devices and/or other gateways 130. While only a few gateways 130, devices 140, and user systems 130, one platform 110, one set of server(s) 112, and one set of database(s) 114 are illustrated, it should be understood that the infrastructure may comprise any number of gateway(s), device(s), user system(s), platform(s), sets of server(s), and database(s).

Platform 110 may comprise web servers that host one or more websites or web services. In embodiments in which a website is provided, the website may comprise one or more user interfaces, including, for example, webpages generated in HyperText Markup Language (HTML) or other language (e.g., a graphical-based and/or text-based language). Platform 110 transmits or serves these user interfaces in response to requests from user system(s) 150. It should be understood that user system(s) 150 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, Automated Teller Machines, Point-of-Sale (POS) terminals, intelligent wearable devices, medical or healthcare devices, any device within an IoT ecosystem, and the like.

In some embodiments, these user interfaces may be served in the form of a wizard, in which case two or more user interfaces may be served in a sequential manner, and one or more of the sequential user interfaces may depend on an interaction of the user or user system 150 with one or more preceding user interfaces. The requests to platform 110 and the responses from platform 110, including the user interfaces, may both be communicated through network(s) 120, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) or devices that are locally and/or remotely accessible to platform 110. Platform 110 may also respond to other requests from user system(s) 150.

Platform 110 may further comprise, be communicatively coupled with, or otherwise have access to one or more database(s) 114. For example, platform 110 may comprise one or more database servers that manage one or more databases 114. A user system 150 or application executing on platform 110 may submit data (e.g., user data, form data, etc.) to be stored in the database(s) 114, and/or request access to data stored in such database(s) 114 (e.g., if requested by an entitled user). Any suitable database may be utilized, including without limitation, any relational or non-relational database, datastore, data blob, and the like, including cloud-based database instances and proprietary databases. Data may be sent to platform 110, for instance, using the well-known POST request supported by HTTP, via FTP, other common protocols, proprietary protocols, etc. This data, as well as other requests, may be handled, for example, by cloud-side and/or server-side web technology, such as a servlet or other software module, executed by platform 110. In addition, platform 110 may provide caching to speed up response times (e.g., for common requests).

In embodiments in which a web service is provided, platform 110 may receive requests from user system(s) 150, and provide responses in eXtensible Markup Language (XML) and/or any other suitable or desired format. In such embodiments, platform 110 may provide an application programming interface (API) which defines the manner in which user system(s) 150 may interact with the web service.

Thus, user system(s) 150, which may themselves be cloud environments and/or servers, can define their own user interfaces, and rely on the web service to implement or otherwise provide the backend processes, methods, functionality, storage, etc., described herein. For example, in such an embodiment, a client application executing on one or more user system(s) 150 may interact with a server application executing on platform 110 to execute one or more or a portion of one or more of the various functions, processes, methods, and/or software modules described herein. The client application may be "thin," in which case processing is primarily carried out cloud-side and/or server-side by platform 110. A basic example of a thin client application is a browser application, which simply requests, receives, and renders web pages at user system(s) 150, while platform 110 is responsible for generating the web pages and managing database functions. Alternatively, the client application may be "thick," in which case processing is primarily carried out client-side by user system(s) 150. It should be understood that the client application may perform an amount of processing, relative to platform 110, at any point along this spectrum between "thin" and "thick," depending on the design goals of the particular implementation. In any case, the application, which may wholly reside on either platform 110 or user system(s) 150 or be distributed between platform 110 and user system(s) 150, can comprise one or more executable software modules that implement one or more of the processes, methods, or functions of the application(s) described herein.

1.2. Gateway Synchronization and Operation

While a gateway 130 may comprise any type of device capable of communication with platform 110, in an embodiment, each gateway 130 is a proprietary device. Furthermore, in an embodiment, each gateway 130 manages one or more communicatively connected (e.g., wireless or wired) devices 140.

FIG. 2 illustrates an example physical gateway 130 communicatively connected with platform 110, according to an embodiment. Gateway 130 comprises script manager 132, script engine 134, and device manager 136. Platform 110 comprises a user interface module 116, synchronization module 118, and has access to a virtual gateway 130' (e.g., stored in database(s) 114 in platform 110 or another platform). It should be understood that there may be a plurality of virtual gateways 130' accessible to platform 110. Each virtual gateway 130' may comprise a virtual representation of a physical gateway 130, including script manager 132, script engine 134, device manager 136, and/or any other content or data stored and/or executed on physical gateway 130. A single virtual gateway 130' may exist for individual physical gateways 130 or for groups of two or more physical gateways 130 (which may be identically-configured except for differences in the number and/or activation of devices, device types, and/or device groups). For example, database(s) 114 may store associations between an identifier of a virtual gateway 130' and the identifier(s) of one or more mirrored physical gateway(s) 130 which are or should be synchronized with that virtual gateway 130'.

In an embodiment, when a physical gateway 130 is implemented by copying a first virtual gateway 130' onto the physical gateway, a unique, second virtual gateway is created for and associated with that physical gateway 130 (e.g., via a stored association between the identifier of the physical gateway 130 and the second virtual gateway in database(s) 114). It should be understood that this second virtual gateway may be a copy of the first virtual gateway 130'. Alternatively, the second virtual gateway may be created from scratch, rather than copied from a preexisting first virtual gateway. In either case, the second virtual gateway may be identical in structure to the first virtual gateway. However, when the second virtual gateway is copied from a first virtual gateway 130', any wildcards in any scripts in the first virtual gateway 130' may be dereferenced in the second virtual gateway, in accordance with the physical device(s), device type(s), and/or device group(s) communicatively connected to the associated physical gateway 130. Subsequently, any changes made to the second virtual gateway will be mirrored in the physical gateway 130, and any changes in the physical gateway 130 will be mirrored in the second virtual gateway. Thus, the second virtual gateway, whether created from scratch or as a copy of the first virtual gateway 130', operates in the same manner as first virtual gateway 130', except that it is associated with, and specific to (e.g., dereferenced with respect to), one particular physical gateway 130', whereas the first virtual gateway 130' is associated with, and generalized for, one or multiple physical gateways 130.

User interface module 116 on platform 110 provides a graphical user interface for managing each gateway 130, virtual gateway 130', or groups of two or more physical gateways 130 and/or virtual gateways 130' in a user's domain. In an embodiment, each virtual gateway 130' and each physical gateway 130 associated with that virtual gateway 130' (including, for example, groups of mirrored physical gateways 130 that are associated with a single virtual gateway 130' or multiple virtual gateways 130', for example, distributed across multiple platforms) is managed as a pair or collection. For instance, platform 110 may comprise a web server that serves web page(s) to user system(s) 150. These web page(s) may comprise one or more inputs for creating, modifying (e.g., editing a component, changing the status of a component, such as from active to inactive, etc.), and/or deleting components of gateway(s) 130. For example, the web page(s) may comprise inputs enabling a user to create, modify, or delete a script for one particular physical gateway 130 and its associated virtual gateway 130', or all physical gateways 130 associated with a particular virtual gateway 130' or multiple virtual gateways 130'. As another example, the web page(s) may comprise inputs enabling a user to create, modify, or delete device information (e.g., device drivers, and/or definitions and/or configurations for devices, device types, and/or device groups) for the device manager 136 of one particular physical gateway 130 and its associated virtual gateway 130', or all physical gateways 130 associated with a particular virtual gateway 130' or multiple virtual gateways 130'. In an embodiment discussed below, for each pair of mirrored gateways, synchronization module 118 ensures that added, modified, or deleted scripts and/or device information are added, modified, or deleted, respectively, in both the physical gateway(s) 130, as well as their associated virtual gateway(s) 130'.

In an embodiment, database(s) 114 comprises a master scripting library and/or a virtual gateway script library, either of which may comprise one or more master scripts available to users via user interface module 116. Master scripts may comprise general scripts, tutorial scripts, scripts provided by a value-added reseller, licensed scripts, and/or the like. For example, users may have access to a public set of scripts and/or be able to purchase licenses for access to and use of various scripts or groups of scripts within the master scripting library. Users may access scripts that are accessible to them (e.g., which they are entitled to access and/or modify) in the master scripting library and modify them as needed to create scripts that support the users' needs or requirements. Modified or unmodified scripts can then be copied or mirrored into physical gateway(s) 130 within their control (i.e., their user domain). For example, a user could select a previously-created script from the master scripting library, optionally modify the script, and download and activate the modified or unmodified script to gateway 130 within the user's domain. In an embodiment discussed below, synchronization module 118 would download that activated script to script manager 132 of corresponding physical gateway 130 as soon as a connection to the physical gateway 130 is available. In an embodiment that utilizes wildcards in scripts, if the activated script comprises any wildcards, those wildcards would be dereferenced so as to be replaced by an identifier of a corresponding physical device, physical device type, and/or physical device group communicatively connected to physical gateway 130.

Synchronization module 118 on platform 110 provides synchronization between virtual gateway 130' and physical gateway(s) 130. As discussed above, there may be one-to-one correspondence between one virtual gateway 130' and one physical gateway 130. For example, in the event that a virtual gateway 130' is copied to a particular physical gateway 130, that virtual gateway 130' may be copied, any wildcards in its scripts may be dereferenced, and the copy of the virtual gateway 130' may be uniquely associated with the particular physical gateway 130 in one-to-one correspondence. Additionally, there may be one-to-many correspondence between one virtual gateway 130' and a plurality of physical gateways 130, or many-to-one or many-to-many correspondence between multiple virtual gateways 130' and one or more physical gateways 130. This may occur, for example, when a group of physical gateways 130 is selected to be mirrored to a particular virtual gateway 130' or multiple virtual gateways 130'. However, it should be understood that a single physical gateway 130 may be mirrored to a particular virtual gateway 130', resulting in a one-to-one correspondence, similar to the one-to-one correspondence resulting from a virtual gateway 130' being copied to a physical gateway 130. In an embodiment, the only difference may be that, when a virtual gateway 130' is copied to a physical gateway 130, any scripts in the copy of the virtual gateway 130' on platform 110 are dereferenced with respect to the physical gateway 130, whereas, when a physical gateway 130 is mirrored to virtual gateway(s) 130', the scripts of virtual gateway(s) 130' on platform(s) 110 are not dereferenced. In the latter case, when the physical gateway 130 that is mirrored to the virtual gateway(s) 130' is synchronized with the virtual gateway(s) 130', any downloaded scripts may be dereferenced at the physical gateway 130 (or at platform 110 prior to being downloaded to physical gateway 130), while the scripts in the virtual gateway(s) 130' on platform 110 may continue to include any wildcards. Thus, the synchronization performed by synchronization module 118 may be the same, regardless of the nature of virtual gateway 130', but it should be understood that scripts may need to be dereferenced (e.g., by synchronization module 118 or another module, such as script manager 132 or script engine 134) when the virtual gateway 130' comprises wildcards. Accordingly, regardless of the nature of virtual gateway 130', synchronization between that virtual gateway 130' and its one or multiple associated physical gateways 130 may be referred to herein as "mirroring," and those associated physical gateways 130 may be referred to herein as "mirrored gateways" or "mirrored physical gateways."

In an embodiment, synchronization is performed automatically whenever a change is made to one of the modules to be synchronized (e.g., script manager 132, script engine 134, and/or device manager 136) in either virtual gateway 130' and/or any physical gateway(s) 130 that are associated with virtual gateway(s) 130'. For example, if a script is modified in the script manager of a virtual gateway 130' (e.g., via user interface module 116), synchronization module 118 may automatically download or modify the corresponding script in script manager 132 of any associated physical gateway(s) 130. Similarly, if a device driver, virtual device, virtual device type, and/or virtual device group is added to the device manager of a virtual gateway 130', synchronization module 118 may automatically add the device driver, corresponding physical device, corresponding physical device type, and/or corresponding physical device group, respectively, to device manager 136 of any associated physical gateway(s) 130.

Synchronization module 118 may continuously synchronize with each mirrored gateway 130 as long as a connection 210 exists between platform 110 and the gateway 130. If a connection between platform 110 and a mirrored gateway 130 is lost, synchronization module 118 may perform synchronization as soon as connection 210 between platform 110 and mirrored gateway 130 can be reestablished. In this case, the virtual gateway 130' associated with the mirrored gateway 130, for which a connection 210 is not currently established, acts as a container which saves the configuration of physical gateway 130 to be implemented by synchronization module 118 as soon as connection 210 is established. In alternative or additional embodiments, synchronization may be performed manually (e.g., in response to a user operation) and/or semi-automatically (e.g., following user confirmation in response to a prompt).

It should be understood that, while FIG. 2 illustrates the virtual gateway 130' as comprising virtual representations of the script manager 132, script engine 134, and device manager 136 of associated mirrored physical gateway 130, the virtual gateway 130' may comprise virtual representations of more or fewer components of mirrored physical gateway 130, depending on which elements are needed to be synchronized within the given design. For example, in an embodiment, only the active scripts and/or device information (e.g., device drivers, and/or definitions and/or configurations for devices, device types, and/or device groups) may be synchronized between virtual gateway 130' and mirrored physical gateway 130. In such an embodiment, virtual gateway 130' only needs to comprise a list of scripts, virtual devices, virtual device types, virtual device groups, and/or device drivers to be synchronized with the corresponding active scripts, physical devices, physical device types, physical device groups, and/or device drivers stored locally on the associated mirrored physical gateway 130. In embodiments, in which the virtual gateways 130' are themselves executable (e.g., in the cloud), a common or shared script engine may be utilized to execute scripts from multiple virtual gateways 130' at platform 110.

Script manager 132 on physical gateway 130 manages scripts for controlling one or more physical devices 140, physical device types, and/or physical device groups communicatively connected to mirrored physical gateway 130. In an embodiment, script manager 132 stores the active scripts in a local database in a memory on physical gateway 130. Script manager 132 may subscribe to platform 110 (i.e., be mirrored to a virtual gateway 130' on platform 110), such that synchronization module 118 maintains synchronization between at least a subset of active scripts from the virtual gateway 130', associated with physical gateway(s) 130, and the scripts stored locally in the memory of physical gateway(s) 130. Thus, whenever an active script is added to virtual gateway 130', synchronization module 118 also transfers that script to script manager 132 of each mirrored physical gateway 130 via connection(s) 210, such that the script is stored both locally on each mirrored physical gateway 130 and remotely in virtual gateway(s) 130'. Likewise, whenever a script is deleted or deactivated from virtual gateway 130', synchronization module 118 also requests deletion or deactivation of that script from script manager 132 of each mirrored physical gateway 130 via connection(s) 210, such that the script is deleted from both virtual gateway(s) 130' and physical gateway(s) 130. In addition, whenever an active script is modified in virtual gateway 130', synchronization module 118 communicates with script manager 132 of each mirrored physical gateway 130 via connection(s) 210, in order to implement the same modifications to the locally-stored copy of the script on physical gateway(s) 130 (e.g., by replacing the local script or by applying a delta representing the incremental modification to the local script). It should be understood that, in a similar manner, synchronization module 118 may effect changes in virtual gateway 130' in order to synchronize virtual gateway 130' with modifications to or changes at its associated mirrored physical gateway(s) 130.

In an embodiment, synchronization module 118 synchronizes only active and/or verified scripts in virtual gateway 130' with scripts stored on mirrored physical gateway(s) 130. For example, scripts in virtual gateway 130' may be associated with a status of "active" or "inactive." An "inactive" status indicates that the script should not be executed in virtual gateway 130' and its associated mirrored physical gateway(s) 130, whereas an "active" status indicates that the script should be executed in virtual gateway 130' and its associated mirrored physical gateway(s) 130. When synchronizing scripts from virtual gateway 130' to its associated mirrored physical gateway(s) 130, synchronization module 118 may refrain from synchronizing any scripts with an "inactive" status to mirrored physical gateway(s) 130. Alternatively, synchronization module 118 may add the inactive script to mirrored physical gateway(s) 130, but with its "inactive" status. In addition, if a script in virtual gateway 130' is changed from "active" to "inactive," synchronization module 118 may either change the status of the script to "inactive" in mirrored physical gateway(s) 130 or delete the script from mirrored physical gateway(s) 130.

Synchronization module 118 may treat verified and unverified scripts in a similar manner. Verified scripts are those that have been verified to operate in the intended manner, whereas unverified scripts are those that have not been verified to operate in the intended manner. For example, unverified scripts may comprise incomplete and/or untested scripts, which are still in the process of being developed or debugged. In an embodiment, synchronization module 118 does not mirror unverified scripts from virtual gateway 130' to mirrored physical gateway(s) 130. Alternatively, a user may specify whether or not unverified scripts should be mirrored on physical gateway(s) 130 (e.g., by setting the status of the script to "active" or "inactive," as described above).

In an embodiment, script manager 132 on physical gateway 130 provides locally-stored scripts as inputs to script engine 134. Script engine 134 may comprise a virtual machine that executes input scripts. In an embodiment, physical gateway 130 may also comprise a compiler interposed between, or comprised within one of, script manager 132 and script engine 134. In such an embodiment, scripts stored on physical gateway 130 may be stored as source code, that is fed through the compiler, and output as virtual machine code to be executed by the virtual machine of script engine 134. In an embodiment, the virtual machine of script engine 134 provides threaded execution of multiple scripts in parallel.

In an embodiment, script engine 134 interfaces with device manager 136, which in turn interfaces with device(s) 140 via wired and/or wireless connections. Device manager 136 may comprise one or more drivers for communicating and interacting with device(s) 140, device types, and/or device groups. Device(s) 140 may comprise virtually any type or group and combination of types or groups of devices, including without limitation, sensors (e.g., motion sensors, temperature sensors, humidity sensors, barometers, open/closed sensors, locked/unlocked sensors, etc.), locks (e.g., door or window locks), doors, windows, lights, heating, ventilation, and air conditioning units (HVACs), vending machines, automatic teller machines (ATMs), point-of-sale (POS) terminals, security systems and components, irrigation systems and components, pools or spas, faucets, appliances (e.g., stove, refrigerator, washing machine, etc.), electrical systems and components, gas systems, printers, televisions, speakers, gates, boilers, heating systems, chillers, refrigeration systems, medical or healthcare wearables and systems, etc. Device manager 136 may communicate with device(s) 140 using wired communication (e.g., via physical ports in gateway 130) and/or wireless communication (e.g., BACnet, Modbus, LonWorks, EnOcean, Bluetooth Low Energy (BLE), Wi-Fi, such as 802.11 a/b/g/n/ac, Wi-Fi Low Energy, Z-Wave, ZigBee™, Bluetooth™, near-field communication (NFC), ANT, GPIO, industry standard or proprietary protocols, etc.). In an embodiment, gateway 130 comprises one or more transceivers (e.g., antennas) providing gateway 130 with the ability to communicate via one or more wireless technologies.

Device information ((e.g., device drivers, and/or definitions and/or configurations for devices, device types, and/or device groups) may be added, modified, and/or removed from device manager 136, as needed, depending on the device(s) 140, device types, and/or device groups with which a physical gateway 130 needs to communicate. For example, a first device driver may be added to device manager 136 for communication with and management of a first device, and a second device driver may be added to device manager 136 for communication with and management of a second, different device. The same can be said for different device types and device groups. In addition, device information may be removed from device manager 136, when they are no longer needed (e.g., when gateway 130 no longer needs to communicate with a certain device, device type, or device group).

Device information may be implemented as plug-in software modules to device manager 136, such that each device, device type, device group, and device driver can be easily added, modified, and/or removed from device manager 136 when needed. Advantageously, this enables the features and support of the system (i.e., gateways 130 and platform 110) to be separated from the features and support of the individual device(s) 140, device type(s), and device group(s). In other words, new features to the system (and technical support for those and older features) do not affect device(s) 140, device type(s), and device group(s), since older configurations (e.g., drivers) may be maintained for those device(s), device type(s), and device group(s). Conversely, new features to device(s) 140, device type(s), and device group(s) (and technical support for those and older features) do not affect the system, since the older configurations may continue to properly operate with the affected devices, device type(s), and device group(s) or else the old configurations can be easily replaced with newer configurations (i.e., by plugging in new devices, device types, device groups, and/or device drivers to device manager 136 in place of or in addition to the old devices, device types, device groups, and/or device drivers).

As discussed above, device information (e.g., device drivers, and/or definitions and/or configurations for devices, device types, and/or device groups) in device manager 136 may be synchronized with the device information in the device manager of virtual gateway 130' via synchronization module 118. Thus, if device information is added to physical gateway 130, that device information is also added to the associated virtual gateway 130', and vice versa. Similarly to scripts, device information may be associated with statuses, such as "inactive" or "active" (e.g., a definition and/or configuration of a particular device, device type, and/or device group may be set to "inactive" or "active"), and synchronization module 118 may synchronize device information in device manager 136 of physical gateway 130 with device information in the device manager of virtual gateway 130' in accordance with those statuses.

Device manager 136 provides an interface to receive data from one or more device(s) 140, device types, and device groups and/or send data to one or more device(s) 140, device types, and device groups. For example, device manager 136 may receive sensor data from a sensor device 140 (e.g., a temperature measurement from a temperature sensor, a binary value from an open/closed sensor, the status of a switch, a value representing the detection of motion from a motion sensor, etc.). In addition, device manager 136 may send instructions or commands to an operable device 140 (e.g., a command to a locking device to open or close a deadbolt on a door, a command to a lighting device to turn on or off a floodlight, etc.), device type (e.g., change the temperature on all thermostats), or device group (e.g., reset values for all devices and device types in an HVAC system). Data received by device manager 136 from device(s) 140, device types, and device groups may be provided as inputs to one or more active scripts executing on script engine 134, whereas outputs of one or more active scripts executing on script engine 134 may be sent as or converted into instructions, commands, or other data to one or more devices 140, device types, and device groups by device manager 136. In this manner, the active script(s) executing on script engine 134 (e.g., multiple active scripts executing as parallel threads) may control and/or react to active device(s) 140, device types, and device groups.

In an embodiment, device manager 136 detects unavailable and/or missing devices, device types, and device groups. For example, device manager 136 may implement a conventional heartbeat feature or other method of detecting the loss of a communicative connection for each device 140, device type, and/or device group. In the event that device manager 136 detects that a device, device type, and/or device group, with which it is supposed to and/or has previously had a connection, is no longer connected (e.g., after a predetermined number of attempts at establishing a connection or after a predetermined duration of connection loss), the device manager 136 may execute error processing, which may include generating an alert (e.g., a user interface message, email message, text message, etc.) to notify one or more recipients of the failure.

1.3. Utilization of Virtual Gateways

As a consequence of the synchronization process described above, each mirrored physical gateway 130 is associated with a virtual gateway 130' at platform 110 (e.g., stored in database(s) 114 and operated on by platform 110), or multiple virtual gateways 130' that may be instantiated on one or more platforms 110. In instances in which there are no connection failures, the virtual gateway(s) 130' associated with mirrored gateway(s) 130 will accurately reflect the current configuration of each mirrored gateway 130. For example, the virtual gateway(s) 130' will at least identify each script and device information (e.g., device drivers, and/or definitions and/or configurations for devices, device types, and/or device groups) that is active on the associated mirrored gateway(s) 130. In instances in which there are connection failures, the virtual gateway(s) 130' may not accurately mirror the current configuration of its associated mirrored gateway(s) 130, but such inaccuracies are temporary and will be resolved once connection(s) with the associated mirrored gateway(s) 130 are established. The accurate, continually-updated nature of the virtual gateway(s) 130' provides several utilization opportunities.

1.3.1. Backup and Restore

Since each virtual gateway 130' mirrors its associated physical gateway(s) 130, the virtual gateways 130' can be used as a backup for their associated mirrored physical gateways 130 in the event of a failure. Specifically, in the event that a mirrored physical gateway 130 experiences a failure or is replaced with a new physical gateway 130 (e.g., via a hot swap), the virtual gateway 130' associated with that mirrored physical gateway 130 can be used to restore the recovered or replacement gateway 130 to the proper, up-to-date configuration. This backup and restoration process can be automatic, semi-automatic, or manual. It should be understood that functions of the backup and restoration process can be performed and/or set through graphical user interfaces provided by user interface module 116 of platform 110.

1.3.2. Snapshots

In addition, one or more virtual gateways 130' can be stored as a snapshot or restore point for its associated mirrored gateway(s) 130. For instance, a given physical gateway 130 or group of physical gateways 130 may be associated with a plurality of virtual gateways 130', each representing the configuration of that physical gateway 130 or group of physical gateways 130 at a different point in time (e.g., including one or more past times as well as the current time). Thus, the configuration of the physical gateway 130 could be restored to any point in time represented by one of the plurality of associated virtual gateways 130'. It should be understood that functions of the snapshot process can be performed and/or set through graphical user interfaces provided by the user interface module 116 of platform 110.

1.3.3. Cloud-Based Gateways

Another consequence of the synchronized virtual gateways 130' is that execution of active scripts and/or device drivers and/or management of active devices, device types, and/or device drivers for a given physical gateway 130 can be offloaded to platform 110. For instance, in an embodiment in which platform 110 is a cloud platform (i.e., a public or private platform utilizing shared or private virtual and/or physical resources), execution of active scripts and/or device drivers and/or management of active devices, device types, and/or device drivers for a given physical gateway 130 can be performed "in the cloud." In such an embodiment, the physical gateway 130 may simply provide an electronic interface to device(s) 140, device types, and device groups, while control processing is performed by a script engine on platform 110 and/or communications with device(s) 140, device types, and device groups are managed by a device manager on platform 110. For example, this may be useful in the implementation of a thin gateway 130, or if there is an internal failure in the physical gateway 130 that does not affect its ability to communicate with device(s) 140. In the case of such a failure, a recovery module in platform 110 may automatically switch or initiate switching of the physical gateway 130 to a thin gateway in which script execution and/or device management is offloaded to platform 110.

In an embodiment, a user may specify that one or more functions of certain physical gateways 130 should be performed in the cloud using their associated virtual gateway(s) 130'. It should be understood that, in this case, physical gateways 130 can be initialized from the start as cloud-based gateways, in which one or more of their functions are cloud-based (i.e., performed by associated virtual gateway(s) 130').

1.3.4. Initialization

Furthermore, virtual gateway(s) 130' can be used to quickly configure or initialize new physical gateway(s) 130 (e.g., newly purchased gateways, gateways recovered from a loss of power, hardware failure, etc.). Specifically, in the case that a new gateway is to be configured in the same manner as a previously-configured gateway 130, the new gateway can simply be synchronized with the virtual gateway 130' associated with that previously-configured gateway 130 or added to a type or group of gateways that is automatically and continuously synchronized with the virtual gateway 130' by synchronization module 118. Alternatively, that virtual gateway 130' can be copied to the new physical gateway 130 to generate a new (e.g., dereferenced) copy of the virtual gateway 130' (e.g., at platform 110) that is uniquely associated with the new physical gateway 130. In this case, the new copy of the virtual gateway 130' may be automatically and continuously synchronized with the new physical gateway 130.

1.3.5. Gateway Web Portal

In addition, in an embodiment, virtual gateway 130' in conjunction with user interface module 116 on platform 110 may act as a web portal to the associated physical gateway(s) 130. Specifically, a graphical user interface, constructed based on a virtual gateway 130', can be used by a user to manage the virtual gateway 130' (e.g., edit the virtual gateway 130'). Since changes in the managed virtual gateway 130' are synchronized (e.g., automatically and continuously synchronized) with its associated mirrored physical gateway(s) 130 by synchronization module 118, management of the virtual gateway 130' is also management of the associated mirrored physical gateway(s) 130. In other words, since changes in the virtual gateway 130' are replicated in its associated mirrored physical gateway(s) 130, the virtual gateway 130' and its associated mirrored physical gateway(s) 130 are managed simultaneously by a user through management of the virtual gateway 130' via user interface module 116. However, it should be understood that in an alternative or additional embodiment, user interface module 116 on platform 110 may simply act in conjunction with each mirrored physical gateway 130 to generate a web portal for the physical gateway (e.g., by querying each gateway 130 for its status and/or configuration, and dynamically generating a graphical user interface from the query results).

In an embodiment, the graphical user interface for managing the virtual gateway 130' and its associated mirrored gateway(s) 130 may comprise a user-friendly point-and-click or touch interface. For example, a user can add, edit (e.g., activated/deactivated, modified, etc.), and/or delete scripts on mirrored physical gateway(s) 130 via a simple point-and-click operation or touch operation (e.g., for a user system 150 that is touch-enabled). For example, the graphical user interface may enable a user with the appropriate entitlement to easily select script(s) from a list of scripts (e.g., stored in a similar manner to the master scripting library in database(s) 114 of platform 110) to be added to the associated mirrored gateway(s) 130 associated with a particular virtual gateway 130'. In addition, the graphical user interface may enable an entitled user to easily select script(s) from a list of scripts in the virtual gateway 130' to be removed, edited, verified, activated, and/or deactivated. The graphical user interface may also enable an entitled user to select script(s) from a list of scripts in a first virtual gateway 130' and mirror or copy the script to a second, different virtual gateway 130'. As discussed above, any changes to a virtual gateway 130' will be reflected in all of its associated mirrored gateway(s) 130 with which synchronization module 118 can establish a connection 210.

In an embodiment, the graphical user interface enables an entitled user to select and mirror or copy scripts and/or device information (e.g., device drivers, and/or definitions and/or configurations for devices, device types, and/or device groups) stored in a source (e.g., a virtual gateway 130' and/or a physical gateway 130) from the source to one or more targets (e.g., another virtual gateway 130' and/or a physical gateway 130). For example, an entitled user may select a virtual gateway 130', and select one or more physical gateway(s) 130 to which the selected virtual gateway 130' is mirrored or copied. In a similar manner, an entitled user can select device information, and select one or more physical gateway(s) 130 to which the selected device information is mirrored or copied.

It should be understood that the gateway web portal may be available for all virtual and/or physical gateway(s) to which a user is entitled via platform 110. The gateway web portal may comprise a graphical user interface that enables an entitled user to access (e.g., edit) multiple mirrored virtual and/or physical gateways at once (e.g., all gateways and/or a subset or grouping of gateways within the user's domain) and/or may comprise a graphical user interface which enables a user to access mirrored virtual and/or physical gateways individually.

1.4. Script Editor

In an embodiment, user interface module 116 of platform 110 provides a graphical user interface (i.e., a script editor) to a user for creating and editing scripts stored in a library of scripts (e.g., the master scripting library and/or gateway script library discussed above) and/or on virtual gateways 130' and physical gateways 130. As discussed elsewhere herein, scripts may be edited at one or more points during gateway management (e.g., by entitled users on gateway(s) within those users' domains, on authorized and authenticated devices, etc.). For instance, a script may be selected for editing from a master scripting library and/or from a list of scripts stored in a virtual gateway 130' or physical gateway 130.

As one example, in response to an entitled user selecting an identifier of a particular physical gateway from a graphical user interface, user interface module 116 may provide the user with a list of scripts stored on the selected physical gateway. Then, in response to the user selecting an identifier of a particular script from the list of scripts, user interface module 116 may provide the user with a user interface for the script editor. Once the user indicates in the script editor that editing of the script has been completed (e.g., by operating a "save" icon or button in the script editor to save the script, whether complete or incomplete, verified or unverified, active or inactive), user interface module 116 may return the user to the list of scripts stored on the selected physical gateway.

In an embodiment, the script editor enables an entitled user to construct scripts by graphically piecing various script components together semantically and syntactically. For example, the script components may include, without limitation, triggers, conditions, devices, device attributes or properties, actions, and the like. The script editor may comprise an interactive interface that enables the user to graphically, semantically and syntactically, place and connect these components in a logical manner. The script editor may check for correct semantics and syntax during and/or after editing. If the script is incorrect semantically and/or syntactically, the script editor may highlight the errors for the user to correct. In addition, the script editor may prohibit the user from saving the script as complete and/or activating the script. Furthermore, the script editor may convert the user-constructed components into an underlying standard or proprietary scripting language (e.g., during editing, after the script has been saved, after the script has been activated, after the script has been verified for correct semantics and syntax, etc.). Alternatively or additionally, the script editor may enable the user to simply write a script directly using the underlying scripting language. In either case, the underlying scripting language may be compiled into code (e.g., virtual-machine code, bytecode, or binary code) for execution by script engine 134.

The script editor may enable an entitled user to change individual components of a script, for example, by changing a particular condition, trigger, or device. The script editor may also enable the user to mirror or copy a script to be used as a template or starting point for a new script. Furthermore, the script editor may enable the user to rename scripts, change the status of a script (e.g., activate or deactivate a script), manually synchronize a virtual gateway 130' with its associated physical gateway(s) 130, and/or automatically, semi-automatically, and/or manually mirror or copy scripts among virtual gateway(s) 130' and/or physical gateway(s) 130.

In an embodiment, when the user is editing a particular script stored in a virtual or physical gateway, the script editor may request dynamic changes from the device manager of the gateway. For instance, if a user is editing a particular script stored on a physical gateway 130, device identifier(s) for all device(s) 140, device types, and/or device groups communicatively connected to the physical gateway may be retrieved by platform 110 (e.g., by querying device manager 136 or other module of physical gateway 130). These device, device type, and/or device group identifier(s) may then be available in the script editor for user selection where appropriate. For example, if a user adds or is editing a particular script component in the script and the particular script component references a particular device, a drop-down menu that includes all of the available device, device type, and/or device group identifier(s) or a subset of device identifier(s) for devices, device types, and/or device groups that are appropriate for the given script component (e.g., sensors for a condition component) may be provided, such that the user may select the appropriate device, device type, or device group identifier to be referenced in the script component. In embodiments that use wildcards, a wildcard version of the device identifier(s) may be made automatically or manually available and/or selectable. For example, specific device, device type, and device group identifier(s) available at the gateway may be converted into regular expressions or otherwise made generic so that they cover a particular type or types of device and/or group or groups of devices (e.g., in a wildcard format, described in more detail elsewhere herein), instead of only covering the particular physical device communicatively connected to the particular gateway.

In an embodiment, the script editor may comprise diagnostic and/or debugging tools. Thus, a script can automatically or manually (e.g., by the user) be evaluated and debugged (e.g., verified) prior to activation (e.g., by checking whether or not the script is semantically and/or syntactically correct), or to address issues that are identified after activation. It should be understood that verifying the script, which may be executed after debugging, may verify operation of the script against the wildcards and/or physical devices, physical device types, and/or physical device groups that are encompassed in the script, may verify the script across all of the gateways on which the script is active, and may provide group diagnostic and debugging information for the entire group of affected gateways.

The script editor may also manage and/or enforce version control for scripts. For example, each incremental modification to a script may be automatically, semi-automatically, and/or manually stored as a new version of the script, and each older version of the script may be maintained in storage for future viewing, reference, roll-back, etc. This version control may be performed for both mirrored and copied scripts.

1.5. Script Wildcards

In an embodiment, one or more wildcards may be used to represent device(s) 140, device type(s), and/or device group(s) in the abstract during the creation or editing of a script (e.g., in the script editor discussed above). A wildcard enables the script to reference a type or types of device (e.g., particular model of thermostat) and/or group or groups of devices (e.g., components of an HVAC system) without being bound to a particular device. A wildcard may take any form (e.g., an asterisk, period, etc.) that is capable of providing a generic device name representing type(s) of devices and/or group(s) of devices.

By using wildcards to reference devices, device types, and/or device groups in a script, the script can be generalized for a plurality of gateways. Thus, in an embodiment, one or more or all of the scripts in the master scripting library may comprise wildcards to represent devices, device types, and/or device groups referenced in the script(s). These wildcards may be maintained in scripts that are added to virtual gateways 130'. Alternatively, the wildcards may be dereferenced when added to virtual gateways 130'. This dereferencing within a virtual gateway 130' may be useful when the virtual gateway 130' is associated with only a single physical gateway 130 or is associated with multiple physical gateways 130 that are communicatively connected to identically-named sets of device(s) 140.

When a script is locally stored onto a physical gateway 130 (e.g., via synchronization module 118) or compiled (e.g., by script manager 132 or script engine 134), any wildcards in the script may be dereferenced (i.e., if not already dereferenced). In other words, the script will assume the properties of the specific devices corresponding to the device(s), device type(s), and/or device group(s) referenced by the wildcards. For instance, each wildcard may be replaced with a specific device identifier (e.g., device number or device name) of a device 140, device type, or device group that is communicatively connected to gateway 130 (e.g., via device manager 136) and satisfies the wildcard.

As a non-limiting example, a script in the master scripting library may reference a device "frontdoorswitch*". In this case, the wildcard is an asterisk "*". Thus, the reference "frontdoorswitch*" generically represents any front door switch within device(s) 140. When the script is implemented on a physical gateway 130, this wildcard is dereferenced (e.g., at the physical gateway 130 on which it is to be executed) by being automatically replaced by designators or other properties of one or more particular physical device(s) 140 communicatively available to the gateway 130 and associated with the wildcard "frontdoorswitch*". The property values of each particular device(s) 140 may then be configured consistent with the wildcard-defined property values for script execution on the physical gateway 130.

In an embodiment, if a device identifier in a list of device(s) 140, device types, or device groups available to a physical gateway 130 matches the reference "frontdoorswitch*", the reference "frontdoorswitch*" is replaced in the script to be executed on the physical gateway 130 with that device identifier. For example, if the list of device identifiers comprises the device identifier "frontdoorswitch01", this device identifier is matched to the reference "frontdoorswitch*" and substituted into the script (e.g., prior to compilation of the script into virtual-machine code) in place of the reference "frontdoorswitch*". Consequently, the dereferenced script will reference identifier(s) for particular device(s), rather than generic device(s) represented by wildcards.

1.6. Script Mirroring

FIG. 3 illustrates a script mirroring module 119 of platform 110, according to an embodiment. In this embodiment, an entitled user with control over one or more mirrored gateways 130 (e.g., 130-1, 130-2, . . . 130-N) may access a graphical user interface (e.g., web page(s)) via user interface module 116 of platform 110 (e.g., using a user system 150). The graphical user interface may comprise one or more inputs for selecting or otherwise identifying a script and one or more inputs for selecting or otherwise identifying a virtual gateway 130' or a group of multiple virtual gateways 130' and/or a physical gateway 130 and/or group of multiple gateways 130. The graphical user interface may also comprise one or more inputs for receiving an indication from the user to "mirror" the identified script to the identified gateway or group of gateways. Script mirroring comprises sending the identified script to each identified virtual and/or physical gateway. In the case that one or more physical gateways are identified, the script is transmitted to the physical gateway(s) over a connection 210 (e.g., 210-1, 210-2, . . . 210-N). For example, script mirroring module 119 may request the script manager 132 of each identified gateway 130 to store a local mirror (e.g., copy) of the script to be executed by the gateway's respective script engine 134.

In addition, script mirroring module 119 may add the identified script to the virtual gateway(s) 130' associated with each identified physical gateway 130. In other words, all virtual gateway(s) 130' associated with a physical gateway 130 are updated to account for the new script mirrored to the physical gateway 130. As noted above, there may be a discrete virtual gateway 130' associated with each physical gateway 130, or there may be a single virtual gateway 130' associated with multiple mirrored (e.g., identically-configured) physical gateways 130.

As an example, an entitled user may select an identifier of a script from the master scripting library discussed above or from a set of user-created scripts. The user may then select an identifier of a virtual or physical gateway, identifiers of multiple virtual or physical gateways, and/or an identifier of a group comprising multiple virtual or physical gateways. In the illustrated example, the group of multiple physical gateways comprises gateways 130-1 to 130-N. When the user performs an operation (e.g., selecting an icon or button) indicating that the identified script should be "mirrored" to the identified physical gateways 130-1 to 130-N, script mirroring module 119 transfers a mirror of the identified script to each of the gateways 130-1 to 130-N over their respective connections 210-1 to 210-N. In other words, the identified script is stored locally at each of physical gateways 130-1 to 130-N. If a mirror of the current version of the identified script is already stored at one of the identified gateways, transfer of the mirror may be selectively skipped or the stored mirror may be overwritten. In addition, in embodiments which utilize the virtual gateway 130' described above, the identified script may be added to the virtual gateway(s) 130' associated with the physical gateway(s) 130-1 to 130-N.

When a script comprising wildcards is mirrored to one or more physical gateways 130, each wildcard in the script is dereferenced at each gateway 130, so as to be automatically replaced with particular device(s) 140, as discussed elsewhere herein. Accordingly, a script with generic device, device type, and/or device group references can be mirrored to a plurality of gateways 130, and the generic device identifier(s) in the mirrored script are automatically replaced with specific identifiers for the specific devices, device types, and/or device groups connected to each respective physical gateway 130.

2. Process Overview

Embodiments of processes for managing control scripts for physical gateways will now be described in detail. It should be understood that the described processes may be embodied in one or more software modules that are executed by one or more hardware processors, which may be executed wholly by processor(s) of platform 110, wholly by processor(s) of gateway(s) 130 and/or user system(s) 150, or may be distributed across platform 110 and gateway(s) 130 and/or user system(s) 150 such that some portions or modules of the application are executed by platform 110 and other portions or modules of the application are executed by gateway(s) 130 and/or user system(s) 150. The described process may implemented as instructions represented in source code, object code, and/or machine code. These instructions may be executed directly by the hardware processor(s), or alternatively, may be executed by a virtual machine operating between object code and the hardware processors. In addition, the disclosed application may be built upon or interfaced with one or more existing systems.

2.1. Gateway Editing

Figure 4:
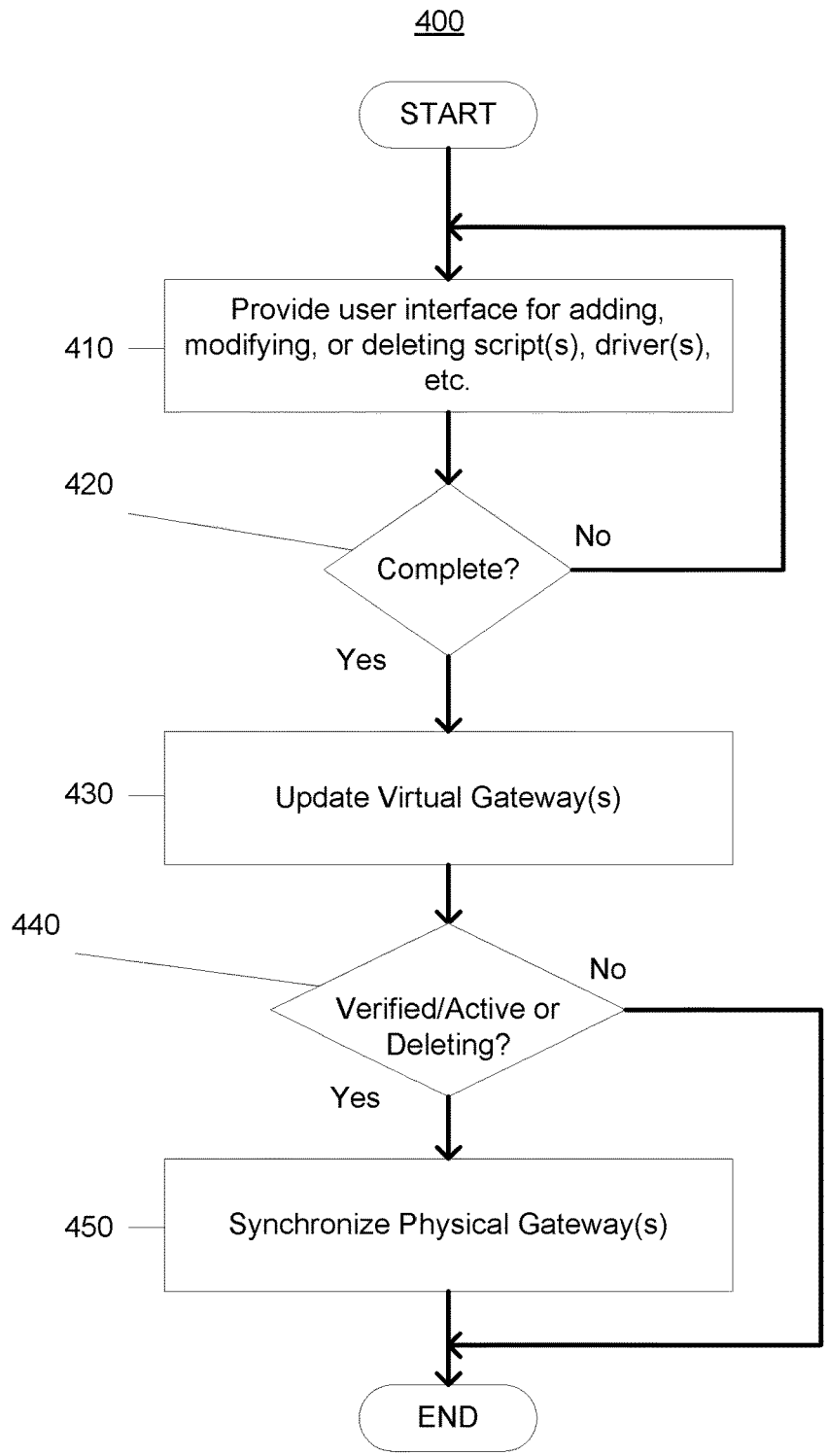
FIG. 4 illustrates a process for editing an editable component of a gateway, according to an embodiment.

FIG. 4 illustrates a process 400 for editing a gateway 130, according to an embodiment. In step 410, a user interface is provided to a user for adding, modifying (e.g., changing components of a script or other component, changing a status of a script or other component, such as activating or deactivating the script), and/or deleting one or more scripts, device information (e.g., device drivers, and/or definitions and/or configurations for devices, device types, and/or device groups), and/or other changeable components of a gateway. For example, this user interface may be provided by user interface module 116 of platform 110. The user interface may be provided for editing changeable components (e.g., script(s), device information, etc.) on a particular virtual gateway (e.g., virtual gateway 130'), on a particular physical gateway (e.g., gateway 130), and/or for the entire platform (e.g., for every virtual gateway 130' and/or physical gateway 130 managed by platform 110) or a subset of the platform (e.g., for only a portion of virtual gateways 130' and/or physical gateways 130 managed by platform 110). In an embodiment, scripts and/or drivers that need attention (e.g., incomplete scripts, unverified scripts, or scripts that have generated an error during compilation or execution on a physical gateway or as a virtual gateway), may be distinguished to a user using highlights (e.g., bold), colors (e.g., red), marks (e.g., "!"), and/or the like.

In an embodiment, the user interface enables an entitled user to select a particular virtual and/or physical gateway, provides a list of components on that gateway, and enables the user to edit each of the components for just that gateway. In the event that the user selects a virtual gateway that is mirrored with multiple physical gateways, it should be understood that editing the components on the virtual gateway may affect each of the associated mirrored physical gateways, as discussed elsewhere herein. In other words, a specific virtual or physical gateway is selected, and one or more of the components on that specific gateway are edited.

In an alternative or additional embodiment, the user interface provides the user with one or more inputs for identifying one or more components, identifying one or more virtual and/or physical gateways to which the components are to be mirrored or copied, and initiating mirroring or copying of the components to the identified gateway(s). Additionally, the user interface may provide the user with one or more inputs for identifying a script stored on one or more virtual and/or physical gateways, and initiating deletion of the script from the gateway(s). Furthermore, the user interface may provide a user, who is modifying a component, one or more inputs for identifying one or more virtual and/or physical gateways to which the modifications should be applied. In other words, specific components are edited, specific virtual and/or physical gateway(s) are selected or otherwise identified, and the edits are implemented to the selected virtual and/or physical gateway(s) (e.g., which could comprise all gateways or any subset of gateways controlled by platform 110).

In step 420, it is determined whether the user has completed the addition, modifying, or deletion of the components (e.g., script, device information, etc.). This determination may take the form of receiving a specific user operation (e.g., on an input of the user interface) or other indication that modification is complete or that an identified component should be added or deleted. In other words, the process may assume that the editing of the component is not complete until the specific user operation is received, instead of blocking or polling.

Once the editing of the component is complete, in step 430, the applicable virtual gateway(s) are updated to reflect the editing. If the edit only affects a single virtual gateway, only that virtual gateway is updated. However, if the edit affects a plurality of virtual gateways, each of the plurality of virtual gateways is updated. In either case, the edits may be applied regardless of the status of the edited component (e.g., irrespective of whether the component, such as a script, is deactivated or unverified).

In step 440, it is determined whether any of the edits involve a verified and/or active component or involve deleting a component from a physical gateway. If so, synchronization with the applicable mirrored physical gateways is performed in step 450 (e.g., by synchronization module 118). Otherwise, no synchronization is necessary, since the edits merely affect incomplete, unverified, or inactive component(s). As discussed elsewhere herein, in an embodiment, incomplete, unverified, and/or inactive components may be saved in virtual gateways but not synchronized to mirrored or selected physical gateways. In an alternative embodiment, incomplete, unverified, inactive, and/or deleted components may be mirrored to and/or maintained at the physical gateway(s), but their statuses may be set to inactive to reflect that they are incomplete, unverified, inactive, or deleted, so that the physical gateway(s) can handle them appropriately (e.g., by not compiling, executing, or otherwise processing them).

It should be understood that the same process 400 can be applied to other changes made to the virtual and physical gateways. That is, process 400 can be similarly applied to user editing of components other than the scripts and drivers of the gateways (e.g., such as script engines 134 of gateways).

2.2. Synchronization

Figure 5:
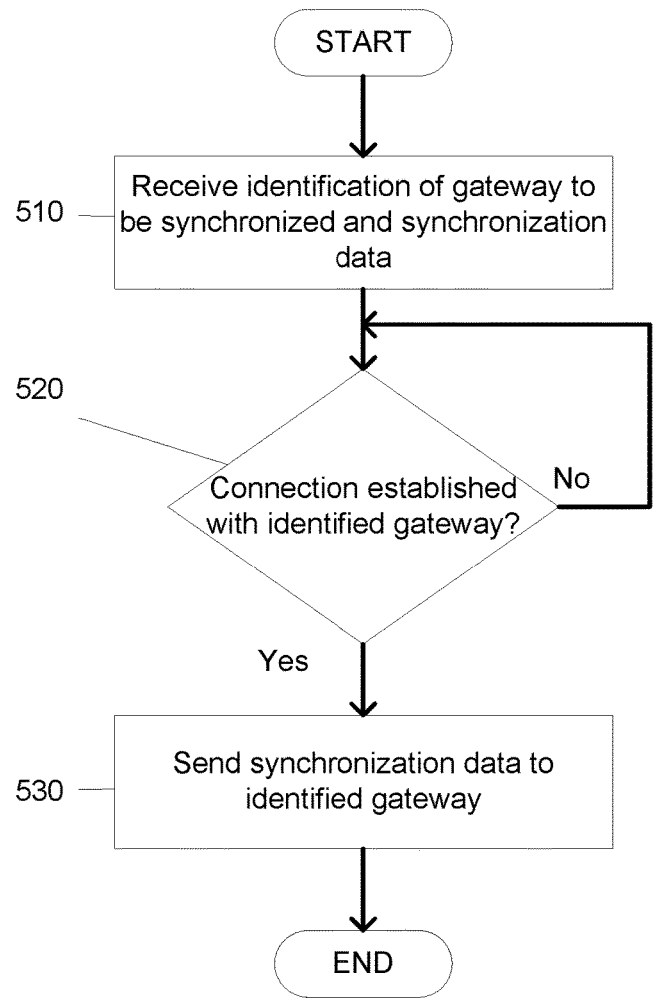
FIG. 5 illustrates a process for synchronizing a gateway, according to an embodiment.

FIG. 5 illustrates a synchronization process 500, according to an embodiment. In an embodiment, process 500 may be, or be comprised in, step 450 of process 400, and may be implemented as, or as part of, synchronization module 118. Process 500 may be performed for each virtual and/or physical gateway requiring synchronization (e.g., each selected or mirrored virtual gateway 130' and/or each selected or mirrored physical gateway 130). For automated synchronization, process 500 may be performed iteratively or in parallel for each gateway requiring synchronization In step 510, a gateway to be synchronized is identified, and synchronization data is received. The synchronization data may comprise any data required to synchronize the identified gateway, and can take any variety of forms or configurations, depending on the particular implementation. For example, in the case that a script must be added to the gateway, the synchronization data may comprise the script. In the case that device information (e.g., device drivers, and/or definitions and/or configurations for devices, device types, and/or device groups) must be added to the gateway, the synchronization data may comprise the device information. In an embodiment, in which incremental changes can be made to the gateway, the synchronization data may comprise a representation of a delta that should be applied to data stored at the gateway in order to bring it into synchronization.

In step 520, it is determined whether or not a connection (e.g., connection 210) with the identified gateway can be or is established. If not, process 500 may block until a connection can be established with the identified gateway. In an embodiment, process 500 may wait a predetermined time before reattempting the connection. In addition, when the connection fails, fails a predetermined number of times, or has not been established after a predetermined time period, process 500 may generate an alert (e.g., a user interface message, email message, text message, etc.) to notify one or more recipients of the failure.

On the other hand, when the connection is established in step 520, the identified gateway is synchronized in step 530. Specifically, the synchronization data is transmitted or otherwise applied to the gateway (e.g., over network(s) 120).

2.3. Wildcards

Figure 6:
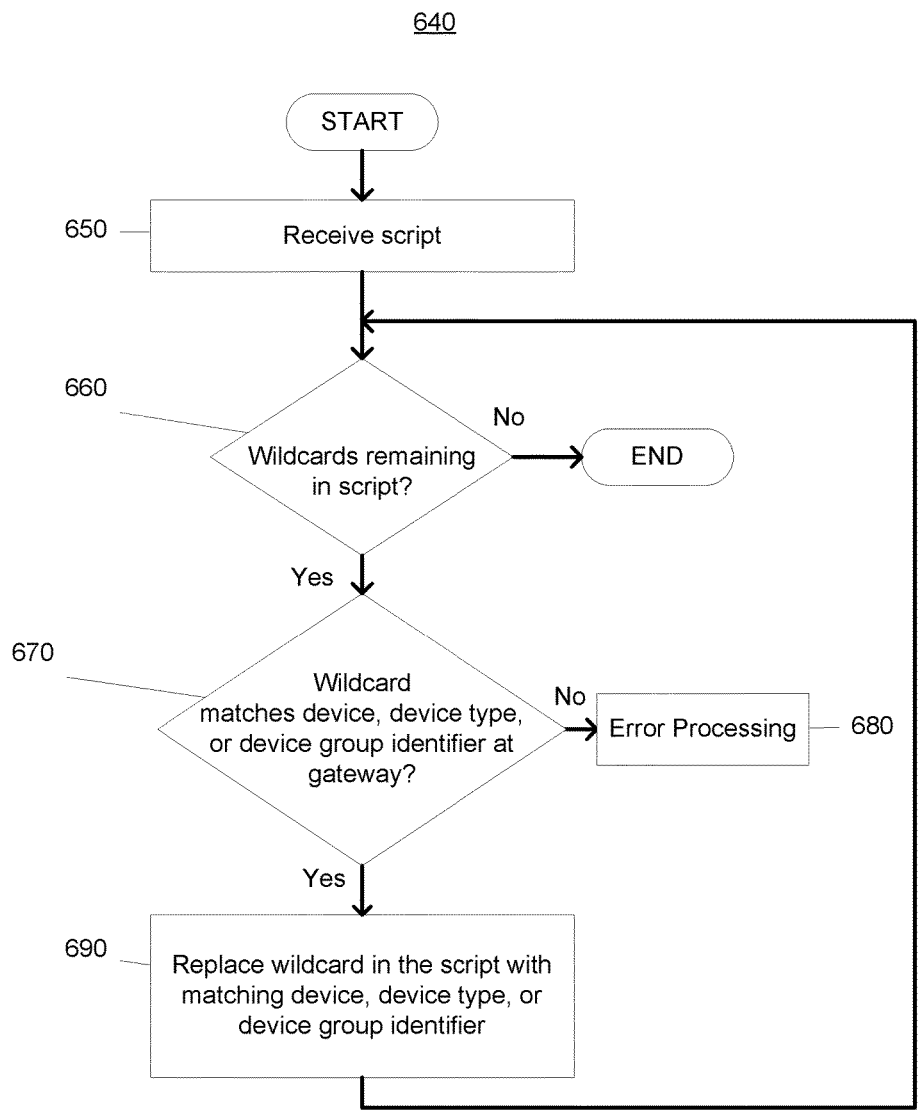
FIG. 6 illustrates a process for dereferencing wildcards in a script, according to an embodiment.

FIG. 6 illustrates a process 640 for dereferencing wildcards in a script, according to an embodiment. As discussed above, scripts of virtual gateways that are associated with multiple physical gateways may comprise wildcards (which are dereferenced at the physical gateway), whereas scripts of virtual gateways that are only associated with a single physical gateway may be dereferenced in the virtual gateway as well as at the physical gateway. Process 640 may be implemented as a module at one or more gateways 130 and/or platform 110.

In step 650, a script is received. As discussed elsewhere herein, the script may contain wildcards, which reference generic identifiers for device(s), device type(s), and/or device group(s). For example, the wildcard may be asertisk(s) or other symbols added to one or more components of a device, device type, or device group identifier (e.g., added to the end of a common prefix for device, device type, or device group identifiers, added to the beginning of a common suffix for device, device type, or device group identifiers). In the example of "frontdoorswitch*", the wildcard is an asterisk added to the prefix "frontdoordevice," indicating that wildcard represents any device identifier beginning with the prefix "frontdoorswitch", regardless of what comes after that prefix in the device identifier.

In step 660, it is determined whether or not any wildcards remain in the script being processed. If the script never contained wildcards or no longer contains any wildcards, process 640 ends. Otherwise, the next wildcard in the script is processed in step 670.

In step 670, a data structure comprising device, device type, or device group identifiers at a particular gateway is searched using the wildcard to identify matching device, device type, or device group identifier(s). The data structure may comprise a database, table, list, object, blob, etc. In an embodiment, the wildcard represents a regular expression, and a device, device type, or device group identifier matches the wildcard if it satisfies the regular expression.

If the wildcard does not match any device, device type, or device group identifier(s), error processing may be performed in step 680. Error processing may comprise generating an alert (e.g., a user interface message, email message, text message, etc.) to notify one or more recipients of the failure, logging the error, and/or the like. Alternatively, instead of performing error processing in step 680, process 640 may skip the unmatched wildcard, end, and/or perform other processing.

If the wildcard does match a device, device type, or device group identifier, the wildcard is replaced in the script with the matching device, device type, or device group identifier in step 690, and the next remaining wildcard, if any, is identified in step 660. If there are multiple matching device, device type, or device group identifiers, the wildcard may be replaced with each matching device, device type, or device group identifier or only a single matching device, device type, or device group identifier (e.g., the first matching device, device type, or device group identifier), depending on the particular implementation of process 640.

3. Example Processing Device

Figure 7:
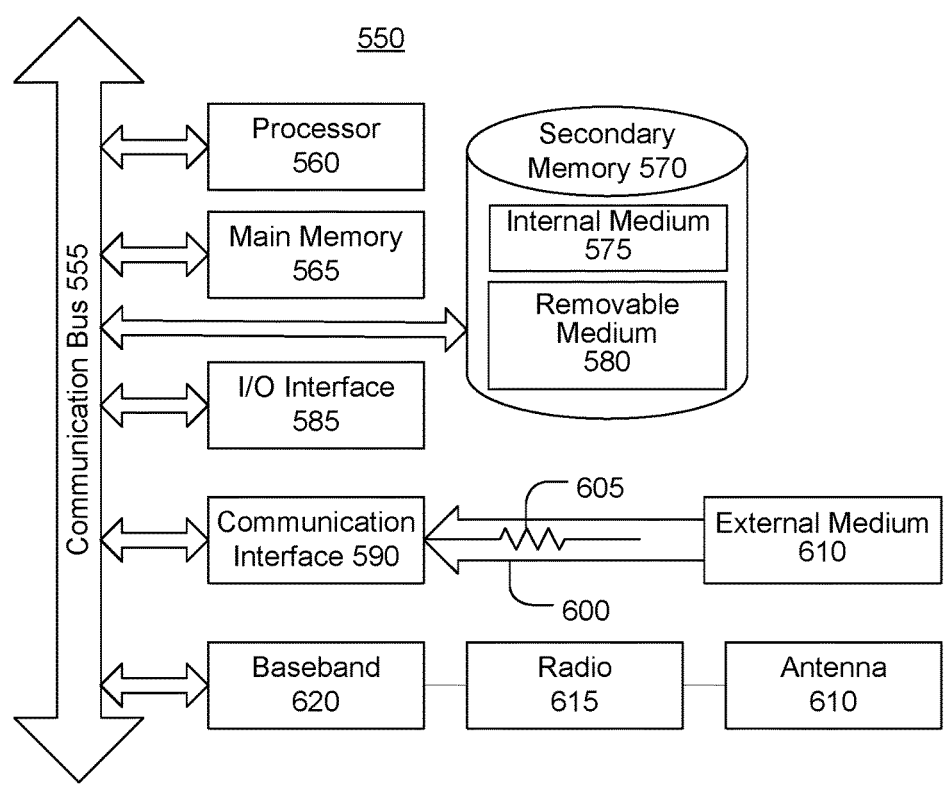
FIG. 7 illustrates a processing system on which one or more of the processes described herein may be executed, according to an embodiment.

FIG. 7 is a block diagram illustrating an example wired or wireless system 550 that may be used in connection with various embodiments described herein. For example the system 550 may be used as or in conjunction with one or more of the mechanisms, processes, methods, or functions (e.g., to store and/or execute one or more software modules) described above, and may represent components of platform 110, server(s) 112, gateway(s) 130, device(s) 140, user system(s) 150, and/or other devices described herein. The system 550 can be a server or any conventional personal computer, or any other processor-enabled device that is capable of wired or wireless data communication. Other computer systems and/or architectures may be also used, as will be clear to those skilled in the art. In addition, it should be understood that while system 550 is illustrated with certain elements, it may comprise fewer or more elements than those illustrated, depending on the particular component it represents. For example, a system 550 without wireless communication capabilities may not include baseband 620, radio 615, and antenna 610.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, Xeon® processor, and other models available from Intel Corporation of Santa Clara, Calif., as well as hardware processors from other manufacturers, such as Advanced Micro Devices of Sunnyvale, Calif.

The processor 560 is preferably connected to a communication bus 555. The communication bus 555 may include a data channel for facilitating information transfer between storage and other peripheral components of the system 550. In addition, the communication bus 555 may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, proprietary visual scripting languages, proprietary scripting languages, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, microSD, etc. The removable medium 580 is read from and/or written to in a well-known manner. Removable storage medium 580 may be, for example, a floppy disk, magnetic tape, CD, DVD, SD card, thumb drive, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for enabling computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block-oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network or cloud server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry-promulgated protocol standards, such as Ethernet IEEE 802 standards, Fiber Channel, digital subscriber line (DSL), asynchronous digital subscriber line (ADSL), frame relay, asynchronous transfer mode, integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software, such as the disclosed application) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the terms "computer-readable medium," "storage medium," and "medium" are used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer-readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies and protocols. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system comprising a server that comprises:
at least one hardware processor; and
a memory storing one or more software modules that, when executed by the at least one hardware processor,
generate a virtual gateway which comprises a representation of each of one or more active scripts stored on at least one remote physical gateway, wherein the at least one remote physical gateway is communicatively connected with one or more external devices, and wherein the one or more active scripts stored on the at least one remote physical gateway and represented in the virtual gateway are configured to monitor or control the one or more external devices,
automatically maintain synchronization, across at least one network, between the one or more active scripts represented in the virtual gateway and the one or more active scripts stored on the at least one remote physical gateway,
detect a failure of the at least one remote physical gateway, and,
in response to the failure of the at least one remote physical gateway, locally execute the one or more active scripts represented in the virtual gateway at the server, in place of the one or more active scripts stored on the at least one remote physical gateway to monitor or control the one or more external devices.

2. The system of claim 1, wherein at least one of the one or more active scripts stored on the at least one remote physical gateway and represented in the virtual gateway are configured to control at least one of the one or more external devices based on at least one condition.

3. The system of claim 2, wherein the at least one condition is communicated from another gateway.

4. The system of claim 1, wherein at least one of the one or more active scripts stored on the at least one remote physical gateway and represented in the virtual gateway are configured to control at least a first one of the one or more external devices based on at least one condition of at least a second one of the one or more external devices.

5. The system of claim 4, wherein the second external device comprises a sensor, and wherein the at least one of the one or more active scripts stored on the at least one remote physical gateway and represented in the virtual gateway are configured to control the first external device based on an output received from the sensor of the second external device.

6. The system of claim 1, wherein the failure of the at least one remote physical gateway comprises an internal failure that does not affect communication between the at least one remote physical gateway and the one or more external devices.

7. The system of claim 6, further comprising the at least one remote physical gateway, and wherein the at least one remote physical gateway, in response to the internal failure, switches to a thin gateway in which execution of the one or more active scripts stored on the at least one remote physical gateway is offloaded to the virtual gateway at the server.

8. The system of claim 1, wherein the virtual gateway further comprises a representation of each of one or more active drivers stored on the at least one remote physical gateway, and wherein the one or more software modules further:
provide at least one user interface for editing each of the one or more active drivers represented in the virtual gateway; and
automatically maintain synchronization, across the at least one network, between the one or more active drivers represented in the virtual gateway and the one or more active drivers stored on the at least one remote physical gateway.

9. The system of claim 1, wherein the one or more software modules further provide at least one user interface for editing each of the one or more active scripts represented in the virtual gateway.

10. The system of claim 1, wherein the at least one remote physical gateway comprises a plurality of remote physical gateways associated with the virtual gateway, and wherein the one or more software modules further automatically maintain synchronization, across the at least one network, between the one or more active scripts represented in the virtual gateway and the one or more active scripts stored on each of the plurality of remote physical gateways.

11. The system of claim 1, wherein the virtual gateway further comprises a representation of each of one or more inactive scripts which are not synchronized with any scripts stored on the at least one remote physical gateway.

12. The system of claim 1, further comprising the at least one remote physical gateway, wherein the at least one remote physical gateway comprises:
a compiler configured to compile the one or more active scripts stored on the at least one remote physical gateway into one or more virtual-machine codes; and
a virtual machine configured to execute the one or more virtual-machine codes.

13. A method for managing a gateway, the method comprising using at least one hardware processor of a server to:
generate a virtual gateway which comprises a representation of each of one or more active scripts stored on at least one remote physical gateway, wherein the one or more active scripts stored on the at least one remote physical gateway are configured to monitor or control one or more external devices communicatively coupled to the at least one remote physical gateway;
automatically maintain synchronization, across at least one network, between the one or more active scripts represented in the virtual gateway and the one or more active scripts stored on the at least one remote physical gateway;
detect a failure of the at least one remote physical gateway; and
in response to the failure of the at least one remote physical gateway, locally execute the one or more active scripts represented in the virtual gateway at the server, in place of the one or more active scripts stored on the at least one remote physical gateway, to monitor or control the one or more external devices communicatively coupled to the at least one remote physical gateway.

14. The method of claim 13, wherein at least one of the one or more active scripts stored on the at least one remote physical gateway and represented in the virtual gateway are configured to control at least one of the one or more external devices based on at least one condition.

15. The method of claim 14, wherein the at least one condition is communicated from another gateway.

16. The method of claim 13, wherein at least one of the one or more active scripts stored on the at least one remote physical gateway and represented in the virtual gateway are configured to control at least a first one of the one or more external devices based on at least one condition of at least a second one of the one or more external devices.

17. The method of claim 13, wherein the failure of the at least one remote physical gateway comprises an internal failure that does not affect communication between the at least one remote physical gateway and the one or more external devices, and wherein the method further comprises, in response to the internal failure, switching to a thin gateway in which execution of the one or more active scripts stored on the at least one remote physical gateway is offloaded to the virtual gateway at the server.

18. A non-transitory computer-readable medium having instructions stored thereon, wherein the instructions, when executed by a processor, cause the processor to:
generate a virtual gateway which comprises a representation of each of one or more active scripts stored on at least one remote physical gateway, wherein the one or more active scripts stored on the at least one remote physical gateway are configured to monitor or control one or more external devices communicatively coupled to the at least one remote physical gateway;
automatically maintain synchronization, across at least one network, between the one or more active scripts represented in the virtual gateway and the one or more active scripts stored on the at least one remote physical gateway;
detect a failure of the at least one remote physical gateway; and,
in response to the failure of the at least one remote physical gateway, locally execute the one or more active scripts represented in the virtual gateway at the server, in place of the one or more active scripts stored on the at least one remote physical gateway, to monitor or control one or more external devices communicatively coupled to the at least one remote physical gateway.

* * * * *